United States Patent
Frenne et al.

(10) Patent No.: US 11,290,240 B2
(45) Date of Patent: *Mar. 29, 2022

(54) SIGNALING OF MEASUREMENT SIGNALS BASED ON A TREE STRUCTURE

(71) Applicant: Telefonaktiebolaget LM Ericsson (publ), Stockholm (SE)

(72) Inventors: Mattias Frenne, Uppsala (SE); Stephen Grant, Pleasanton, CA (US); Robert Mark Harrison, Grapevine, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/153,085

(22) Filed: Jan. 20, 2021

(65) Prior Publication Data

US 2021/0143969 A1 May 13, 2021

Related U.S. Application Data

(63) Continuation of application No. 16/347,263, filed as application No. PCT/SE2017/051082 on Nov. 2, 2017, now Pat. No. 10,931,429.

(Continued)

(51) Int. Cl.
*H04L 5/00* (2006.01)
*H04B 17/336* (2015.01)
*H04B 7/06* (2006.01)

(52) U.S. Cl.
CPC ......... *H04L 5/0073* (2013.01); *H04B 7/0623* (2013.01); *H04B 17/336* (2015.01);
(Continued)

(58) Field of Classification Search
CPC ..................................................... H04L 5/0073
(Continued)

(56) References Cited

U.S. PATENT DOCUMENTS 10,931,429 B2 * 2/2021 Frenne ................. H04L 5/0051
2015/0288497 A1 10/2015 Li et al.
(Continued)

FOREIGN PATENT DOCUMENTS

CN 103516464 A 1/2014
CN 104081813 A 10/2014
(Continued)

OTHER PUBLICATIONS

Koorapaty, Havish, et al., "Reference Signals for Improved Energy Efficiency in LTE", Ericsson Research, USA, 2013, 1-5.
(Continued)

*Primary Examiner* — Lihong Yu
(74) *Attorney, Agent, or Firm* — Murphy, Bilak & Homilier, PLLC

(57) ABSTRACT

One or more nodes transmit CSI-RS symbols in a set of N CSI-RS elements, each CSI-RS element in the set corresponding to at least one resource element in a time-frequency grid of resource elements. The nodes select, from the N CSI-RS elements, a first set of CSI-RS elements to be measured by a first wireless device, the first set comprising one or several of the N CSI-RS elements. The nodes also transmit, to the first wireless device, a message comprising a first K-bit indicator identifying the first set of CSI-RS elements, wherein K<N. The nodes then receive a measurement report. The first K-bit indicator is one of a predetermined set of K-bit indicators, where each member of the predetermined set of K-bit indicators uniquely corresponds
(Continued)

to a CSI-RS element or group of CSI-RS elements from among the N CSI-RS, according to a predetermined mapping.

20 Claims, 13 Drawing Sheets

Related U.S. Application Data

(60) Provisional application No. 62/417,875, filed on Nov. 4, 2016.

(52) U.S. Cl.
CPC ............ *H04L 5/005* (2013.01); *H04L 5/0007* (2013.01); *H04L 5/0051* (2013.01); *H04L 5/0094* (2013.01)

(58) Field of Classification Search
USPC ........................................................ 375/262
See application file for complete search history.

(56) References Cited

U.S. PATENT DOCUMENTS

| | | |
|---|---|---|
| 2017/0202014 A1 | 7/2017 | Moon et al. |
| 2018/0098234 A1 | 4/2018 | Kim et al. |
| 2019/0288823 A1 | 9/2019 | Frenne et al. |

FOREIGN PATENT DOCUMENTS

| | | |
|---|---|---|
| JP | 2014510464 A | 4/2014 |
| JP | 6805343 B2 | 12/2020 |
| RU | 2600569 C2 | 10/2016 |
| WO | 2011162112 A1 | 12/2011 |
| WO | 2012112281 A2 | 8/2012 |
| WO | 2016122257 A1 | 8/2016 |

OTHER PUBLICATIONS

3GPP, "3rd Generation Partnership Project; Technical Specification Group Radio Access Network; Study on New Radio (NR) Access Technology Physical Layer Aspects (Release 14)", 3GPP TR 38.802 V0.3.0 (Oct. 2016), Oct. 2016, 1-43.

Unknown, Author, "Aperiodic CSI and CSI-RS resource pooling", 3GPP TSG-RAN WG1 #86bis, R1-1609763, Lisbon, Portugal, Oct. 10-14, 2016, 1-4.

Unknown, Author, "CSI-RS Design", 3GPP TSG-RAN WG1 #86bis, R1-1609765, Lisbon, Portugal, Oct. 10-14, 2016, 1-7.

Unknown, Author, "Overview of CSI feedback framework for NR", 3GPP TSG-RAN WG1 #86, R1-1609758, Lisbon, Portugal, Oct. 10-14, 2016, 1-5.

Unknown, Author, "PDSCH rate-matching for A-CSI-RS", 3GPP TSG RAN WG1 Meeting #86, R1-1610105, Lisbon, Portugal, Oct. 10-14, 2016, 1-4.

Unknown, Author, "WF on Aperiodic CSI-RS for Rel.14", 3GPP TSG RAN WG1 Meeting #86, R1-168046, Gothenburg, Sweden, Aug. 22-26, 2016, 1-6.

* cited by examiner

| DCI | DMRS | CSI-RS | | | | |
|-----|------|--------|--|--|--|--|
| DCI | DMRS | CSI-RS | | | | |
| DCI | DMRS | CSI-RS | | | | |
| DCI | DMRS | CSI-RS | | | | |
| DCI | DMRS | CSI-RS | | | | |
| DCI | DMRS | CSI-RS | | | | |
| DCI | DMRS | CSI-RS | | | | |
| DCI | DMRS | CSI-RS | | | | |
| DCI | DMRS | CSI-RS | | | | |
| DCI | DMRS | CSI-RS | | | | |
| DCI | DMRS | CSI-RS | | | | |
| DCI | DMRS | CSI-RS | | | | |

*FIG. 2*

SIGNALING OF MEASUREMENT SIGNALS BASED ON A TREE STRUCTURE

TECHNICAL FIELD

The present disclosure is generally related to wireless communications networks and is more particularly related to techniques for controlling the measurement of channel-state information reference signals (CSI-RS) in such networks.

BACKGROUND

In the Long-Term Evolution (LTE) wireless communications system standardized by members of the 3$^{rd}$-Generation Partnership Project (3GPP) and widely deployed today, a reference symbol sequence referred to as a Channel-State Information Reference Signal (CSI-RS) is transmitted by the base stations (referred to as eNodeB's, or eNBs, in 3GPP terminology). These CSI-RS are measured by receiving wireless devices ("user equipment," or "UEs," in 3GPP terminology), with the resulting measurements being used to estimate the channel from the base station to the wireless device. Importantly, these measurements reflect not only the propagation conditions from the antennas of the base station to the wireless device, but also reflect the antenna gains, polarization, and any multi-antenna aspects of the transmission. Accordingly, by mapping different antennas or different combinations of antennas to different CSI-RS elements and configuring a UE to measure and report on each of these elements, the network can determine which antennas or combinations of antennas provide the most effective channel to the UE.

A CSI-RS targeted to a particular UE or group of UEs may be referred to as non-zero-power CSI-RS (NZP CSI-RS). A UE may also be configured with (i.e., informed of) so-called zero power CSI-RS (ZP CSI-RS). The ZP CSI-RS is mainly used for interference measurement resource indication. A ZP CSI-RS for one UE may correspond to a (NZP) CSI-RS for one or more other UEs within same the cell or within a neighbor cell. A UE for which a ZP CSI-RS resource has been configured should assume that physical downlink shared channel (PDSCH) mapping avoids the resource elements corresponding to the ZP CSI-RS, as well as any resource elements with NZP CSI-RS.

The NZP CSI-RS is not used for demodulation of the data signal, and thus does not require the same density (i.e., the overhead of the NZP CSI-RS is substantially less) as the demodulation RS (DMRS). Compared to DMRS, NZP CSI-RS provides a much more flexible means to configure CSI feedback measurements. For instance, the network may configure, in a UE-specific manner, which particular NZP CSI-RS the UE should measure, of several available NZP CSI-RS resources to the UE.

By measuring on a NZP CSI-RS, a UE can estimate the effective channel the NZP CSI-RS has traversed, including the radio propagation channel and antenna gains. In mathematical terms, this means that if a known NZP CSI-RS signal x is transmitted, a UE can estimate the coupling between the transmitted signal and the received signal (i.e., the effective channel). Hence, if no virtualization is performed in the transmission, the received signal y can be expressed as:

$$y = Hx + e, \quad \text{(Eq. 1)}$$

and the UE can estimate the effective channel H.

In LTE, as of Release 11 of the 3GPP specifications, up to eight NZP CSI-RS ports can be configured for a UE, where a "port" corresponds to a predefined set of resource elements in the Orthogonal Frequency-Division Multiplexing (OFDM) time-frequency grid that makes up each subframe of the LTE downlink signal. At the network side, the eNB can map any transmit antenna or combination of transmit antennas to a given port. Thus, by performing measurements on the specific resource elements that correspond to each CSI-RS port that is configured for the UE, a UE conforming to Release 11 of the 3GPP specifications for LTE can thus estimate the channel from up to eight transmit antenna ports.

As seen in FIGS. 1A, 1B, and 1C, many different NZP CSI-RS patterns are available in LTE, where the mapping of the CSI-RS ports to the LTE downlink subframe depends on whether two, four, or eight CSI-RS ports are in use. (Herein, the terms "CSI-RS port," "CSI-RS antenna port," and "antenna port" may be used interchangeably, to refer to the particular resource elements that are identified as a particular CSI-RS measurement resource and that are implicitly mapped to a transmit antenna or combination of antennas at the eNB). More particularly, FIGS. 1A-1C illustrates the time-frequency resource element grid for the LTE downlink signal, over a resource block pair, for the cases of two, four, and eight CSI-RS ports.

From FIG. 1A, it can be seen that for the case of two CSI-RS antenna ports, there are twenty different patterns within a subframe; a given UE may be configured to measure any one or more of these, and may be further configured with information indicating that one or more of these are ZP CSI-RS resources, with respect to that particular UE. The corresponding number of patterns is ten and five, for configurations involving four and 8 CSI-RS antenna ports, respectively. This is shown in FIGS. 1B and 1C. For LTE systems operating in a Time-Division Duplexing (TDD) configuration, some additional CSI-RS patterns are available.

3GPP has begun developing specifications for a new fifth-generation (5G) radio access technology, currently referred to as "New Radio," or NR. Members of 3GPP have reached initial agreements on a few design principles for NR, including that it should utilize an "ultra-lean" design, in that the transmission of "always-on" signals should be minimized or eliminated. Further, it is a common understanding that NR will consider frequency ranges up to 100 GHz. In comparison to the current frequency bands allocated to LTE, some of the new bands will have much more challenging propagation properties such as lower diffraction and higher outdoor/indoor penetration losses. Consequently, signals will have less ability to propagate around corners and penetrate walls. In addition, in high frequency bands, atmospheric/rain attenuation and higher body losses render the coverage of NR signals even spottier. Fortunately, operation in higher frequencies makes it possible to use smaller antenna elements, which enables the deployment of antenna arrays with many antenna elements at the NR access nodes, which may be referred to herein as "gNBs." Such antenna arrays facilitate beamforming, where multiple antenna elements are used to form narrow beams and thereby compensate for the challenging propagation properties. For these reasons, it is widely accepted that NR will rely on beamforming to provide coverage, which means that NR is often referred to as a beam-based system.

In NR, a similar approach to channel state estimation as employed in LTE is foreseen. However, in NR, the downlink signal is not expected to include cell-specific reference signals (CRS), which are distributed throughout the LTE subframes. This means that the placement of CSI-RS can be more flexible than in LTE.

There have been discussions on placing the NZP CSI-RS in one or a few OFDM symbols of the NR downlink subframe. FIG. 2, for example, illustrates the placing of CSI-RS in one OFDM symbol of a slot (seven symbols one-half of a subframe). As seen in the figure, the first OFDM symbol contains the control channel, which carries downlink control information (DCI) for UEs, while the next OFDM symbol carries demodulation reference signals (DMRS) for use by the UEs in demodulating the control channel. The third symbol in the illustrated example carries CSI-RS symbols.

A CSI-RS resource or CSI-RS element includes reference signals for one or multiple antenna ports. The reference signal may be repeated over the whole frequency bandwidth or in a predefined or configurable partial bandwidth. Note that the terms "CSI-RS resource" and "CSI-RS element" should not be confused with the term "resource element," which is used herein to refer to the smallest time-frequency resource in an OFDM time-frequency grid.

One possibility for creating a CSI-RS resource is that a CSI-RS element that has two antenna ports is introduced. CSI-RS configurations with an arbitrary number of antenna ports can be obtained by aggregating CSI-RS elements. Note that an antenna port is equivalent to—or may be understood as an abstraction of—a reference signal. If the UE measures "an antenna port," it measures the channel from the transmitter to the receiver for that given antenna port. If spatial transmit diversity is used, for example, then typically two distinct antenna ports are used to provide spatial diversity, meaning that the UE has to estimate two channels to demodulate the message.

In FIG. 2, each CSI-RS could correspond to a distinct antenna port, in which case the figure shows a total of twelve CSI-RS antenna ports that are frequency multiplexed. Given this example configuration for the downlink signal, the UE can be configured to measure on one of these CSI-RS ports or on all twelve CSI-RS ports, depending on the use case. The twelve CSI-RS resources, each with a single antenna port, can thus be seen as a pool or a set of CSI-RS resources.

When beamformed CSI-RS is used, each beam typically has two polarizations, if a dual-polarized antenna array is used. A beam is created by a certain multi-antenna precoder, such as a discrete Fourier transform (DFT)-based precoder. Hence, different ones of such precoders, having DFT structures, generate transmitted beams pointing in different azimuth directions. Sometimes a two-dimensional antenna array is used with phase-controllable antenna elements and a DFT precoder is used in both a vertical and horizontal direction, so that a beam can be steered in the desired elevation and azimuth direction. A CSI-RS element having a size of two ports can be used per beam, in such systems, and in this case each group of two ports may correspond to a different beam. The UE can then be configured to measure and report the channel quality for each beam in a set of beams by using a CSI-RS resource of aggregated 2-port CSI-RS elements.

If non-beamformed CSI-RS is used, then a larger number of ports, e.g., 32, is needed. The aggregation of CSI-RS elements with two ports each is useful also in this case.

While details have not been established, 3GPP members have discussed the use of a set (or a pool) of CSI-RS resources, together with dynamic signaling from gNB to the UE regarding which resource the UE shall use for performing measurements. If the pool is large, however, the signaling overhead is undesirably large. For instance, if the pool consists of 32 resources, then a bitmap of 32 bits is needed to signal any arbitrary configuration of the selected resources. This creates a large signaling overhead. Another problem is that the need for measurements is UE-specific, as well as time-dependent. Sometimes it is sufficient to measure a single resource and sometimes a large set of resources is needed. Accordingly, solutions are needed for providing such flexibility in the signaling, while reducing signaling overhead.

SUMMARY

Some embodiments of the presently disclosed techniques and apparatus address these problems by adopting a tree structure for CSI-RS element aggregation, to allow for CSI-RS configurations of variable aggregation size, where the tree structure is defined in such a way that a larger aggregation size overlaps with an aggregation of smaller aggregation size. The tree structure is motivated by field measurements on beamforming, which have demonstrated that not all beams are equally utilized in practical deployments, which means that there is a correlation among preferred beams.

According to various embodiments, then, the signaling from gNB to UE utilizes an index mapping to the tree structure. After performing measurements on the aggregated CSI-RS resources indicated by the index, the UE may perform a subset selection of the resources and then report back to the gNB the result or results of the measurement. As will be demonstrated in detail below, this signaling approach results in a reduction of the signaling overhead in configuring resources used for CSI measurements, compared to the use of a bitmap that would permit the signaling of any arbitrary configuration of CSI-RS resources.

According to some embodiments, a method for controlling the measurement of CSI-RS elements in a wireless communication network includes, in one or more nodes of the wireless communication network, transmitting CSI-RS symbols in each of N CSI-RS elements, each CSI-RS element in the set corresponding to at least one resource element in a time-frequency grid of resource elements. The method also includes selecting, from the N CSI-RS elements, a first set of CSI-RS elements to be measured by a first wireless device, the first set comprising one or several of the N CSI-RS elements and transmitting, to the first wireless device, a message comprising a first K-bit indicator identifying the first set of CSI-RS elements, wherein K<N. The method further includes receiving, from the first wireless device, in response to the message, a measurement report corresponding to at least one of the first set of CSI-RS elements. The first K-bit indicator is one of a predetermined set of K-bit indicators, where each member of the predetermined set of K-bit indicators uniquely corresponds to a CSI-RS element or group of CSI-RS elements from among the N CSI-RS, according to a predetermined mapping, such that each member of a first subset of the predetermined set of K-bit indicators uniquely indicates a single one of the N CSI-RS elements and such that each member of a second subset of the predetermined indicators uniquely indicates a predetermined group of two or more of the N CSI-RS elements.

According to some embodiments, a method for measuring CSI-RS elements in a wireless communication network includes, in a wireless device, receiving, from the wireless communication network, a message comprising a first K-bit indicator. The method also includes using the first K-bit indicator to identify a first set of CSI-RS from N CSI-RS elements, wherein each CSI-RS element corresponds to at least one resource element in a time-frequency grid of resource elements and wherein K<N. The method further includes performing measurements on the identified first set of CSI-RS elements and sending, to the wireless communications network, a measurement report corresponding to at least one of the first set of CSI-RS elements. The first K-bit indicator is one of a predetermined set of K-bit indicators, where each member of the predetermined set of K-bit indicators uniquely corresponds to a CSI-RS element or group of CSI-RS elements from among the N CSI-RS, according to a predetermined mapping, such that each member of a first subset of the predetermined set of K-bit indicators uniquely indicates a single one of the N CSI-RS elements and such that each member of a second subset of the predetermined indicators uniquely indicates a predetermined group of two or more of the N CSI-RS elements.

According to some embodiments, one or more nodes of a wireless communication network configured to control the measurement of CSI-RS elements in a wireless communication network includes transceiver circuitry and processing circuitry operatively associated with the transceiver circuitry. The processing circuitry is configured to transmit CSI-RS symbols in each of one or more of N CSI-RS elements, each CSI-RS element in the set corresponding to at least one resource element in a time-frequency grid of resource elements. The processing circuitry is also configured to select, from the N CSI-RS elements, a first set of CSI-RS elements to be measured by a first wireless device, the first set comprising one or several of the N CSI-RS elements and transmitting, to the first wireless device, a message comprising a first K-bit indicator identifying the first set of CSI-RS elements, wherein K<N. The processing circuitry is configured to receive, from the first wireless device, in response to the message, a measurement report corresponding to at least one of the first set of CSI-RS elements. The first K-bit indicator is one of a predetermined set of K-bit indicators, where each member of the predetermined set of K-bit indicators uniquely corresponds to a CSI-RS element or group of CSI-RS elements from among the N CSI-RS, according to a predetermined mapping, such that each member of a first subset of the predetermined set of K-bit indicators uniquely indicates a single one of the N CSI-RS elements and such that each member of a second subset of the predetermined indicators uniquely indicates a predetermined group of two or more of the N CSI-RS elements.

According to some embodiments, a wireless device configured to measure CSI-RS elements in a wireless communication network includes transceiver circuitry and processing circuitry operatively associated with the transceiver circuitry. The processing circuitry is configured to receive, from the wireless communication network, a message comprising a first K-bit indicator. The processing circuitry is configured to use the first K-bit indicator to identify a first set of CSI-RS from N CSI-RS elements, where each CSI-RS element corresponds to at least one resource element in a time-frequency grid of resource elements and wherein K<N. The processing circuitry is also configured to perform measurements on the identified first set of CSI-RS elements and sending, to the wireless communications network, a measurement report corresponding to at least one of the first set of CSI-RS elements. The first K-bit indicator is one of a predetermined set of K-bit indicators, where each member of the predetermined set of K-bit indicators uniquely corresponds to a CSI-RS element or group of CSI-RS elements from among the N CSI-RS, according to a predetermined mapping, such that each member of a first subset of the predetermined set of K-bit indicators uniquely indicates a single one of the N CSI-RS elements and such that each member of a second subset of the predetermined indicators uniquely indicates a predetermined group of two or more of the N CSI-RS elements.

Further aspects of the present invention are directed to an apparatus, computer program products or computer readable storage medium corresponding to the methods summarized above and functional implementations of the above-summarized nodes and wireless device. Of course, the present invention is not limited to the above features and advantages. Those of ordinary skill in the art will recognize additional features and advantages upon reading the following detailed description, and upon viewing the accompanying drawings.

BRIEF DESCRIPTION OF THE FIGURES

FIG. 2 illustrates a possible placement of CSI-RS symbols in an NR downlink slot.

DETAILED DESCRIPTION

In the following, concepts in accordance with exemplary embodiments of the invention will be explained in more detail and with reference to the accompanying drawings. The illustrated embodiments relate to channel-state estimation in a wireless communication network, as performed by wireless devices, in the following also referred to as UEs, and access nodes or base stations, also referred to herein as "gNBs." The wireless communication network may for example be based on a 5G radio access technology (RAT), such as the forthcoming 3GPP New Radio (NR) technology. However, it is to be understood that the illustrated concepts could also be applied to other RATs.

It will be appreciated that the fifth generation of mobile telecommunications and wireless technology is not yet fully defined, but is in an advanced draft stage within 3GPP, which includes work on 5G NR Access Technology. LTE terminology is used in this disclosure in a forward-looking sense, to include equivalent 5G entities or functionalities although a different term is specified in 5G. For instance, eNBs in LTE are expected to be succeeded by gNBs, which are expected to share some of the eNB's characteristics and capabilities. However, it will be appreciated that the application of the techniques described herein is not limited by the names placed on these nodes or by the names applied to certain signals. A general description of the agreements on 5G NR Access Technology so far is contained in 3GPP TR 38.802 V0.3.0 (2016-10), of which a draft version has been published as R1-1610848. Final specifications may be published in the future 3GPP TS 38.2** series.

As suggested above, NR (or other wireless system) can utilize a pool of N CSI-RS elements, where each element corresponds to a fixed number of ports, such as 2 ports. This pool of measurement resources may be dynamically shared among users in the cell depending on how the users move around in the cell (across beams) or whether particular users use beamformed CSI-RS or non-precoded CSI-RS. Thus, at any given time, a given UE may be configured to measure a single CSI-RS element, from the N CSI-RS elements that are potentially available in the downlink signal for measurement, or may be configured to measure several or even all of the N CSI-RS elements. Multiple UEs may be configured to measure CSI-RS elements at the same time, using the same, distinct, or overlapping sets of CSI-RS elements. The gNB may signal to the UE which CSI-RS elements the UE shall measure on in a downlink control message referred to as downlink control information (DCI).

Figure 1A:
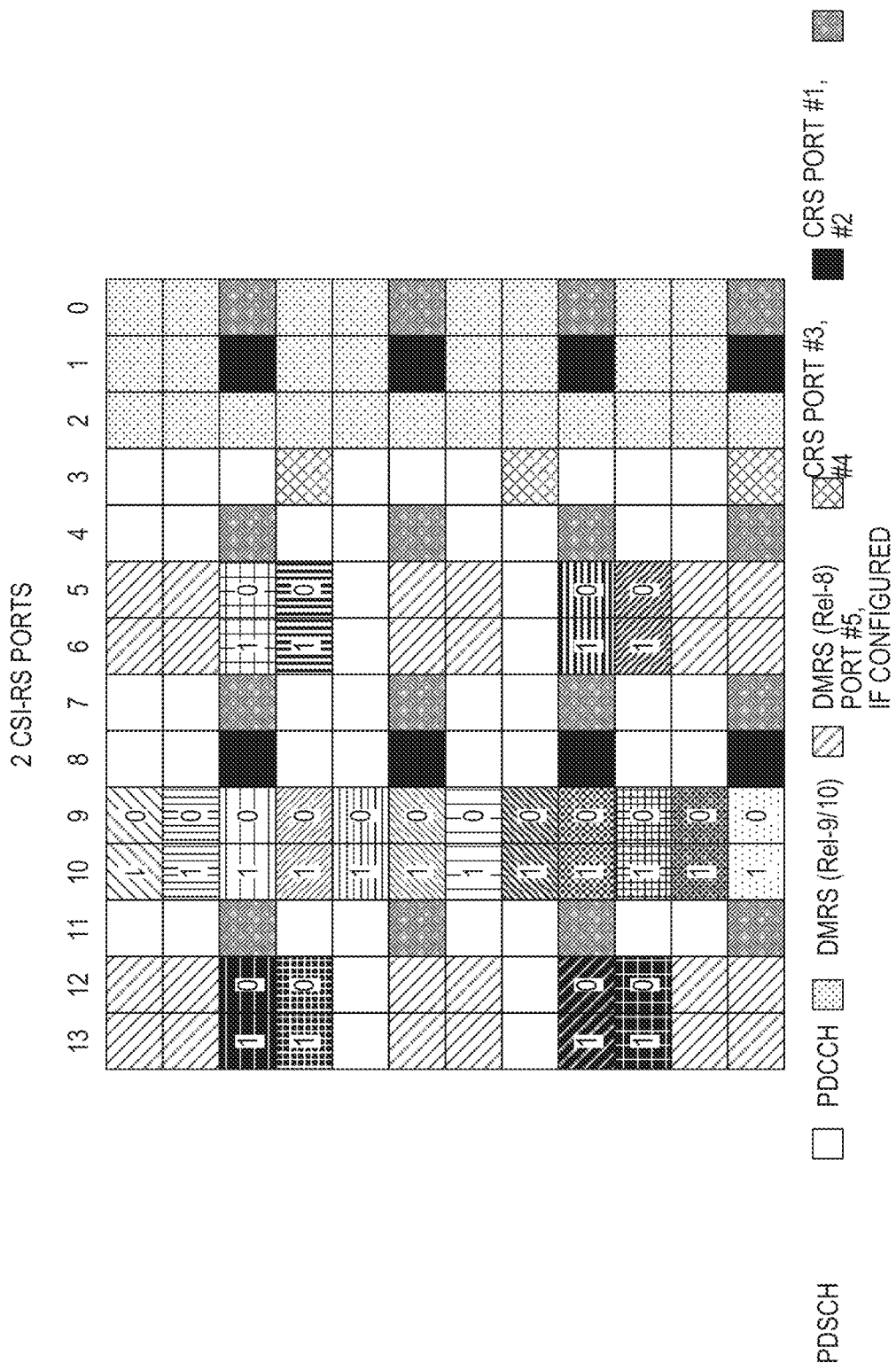
FIGS. 1A, 1B, and 1C illustrate possible CSI-RS patterns in the LTE downlink signal.
Figure 1B:
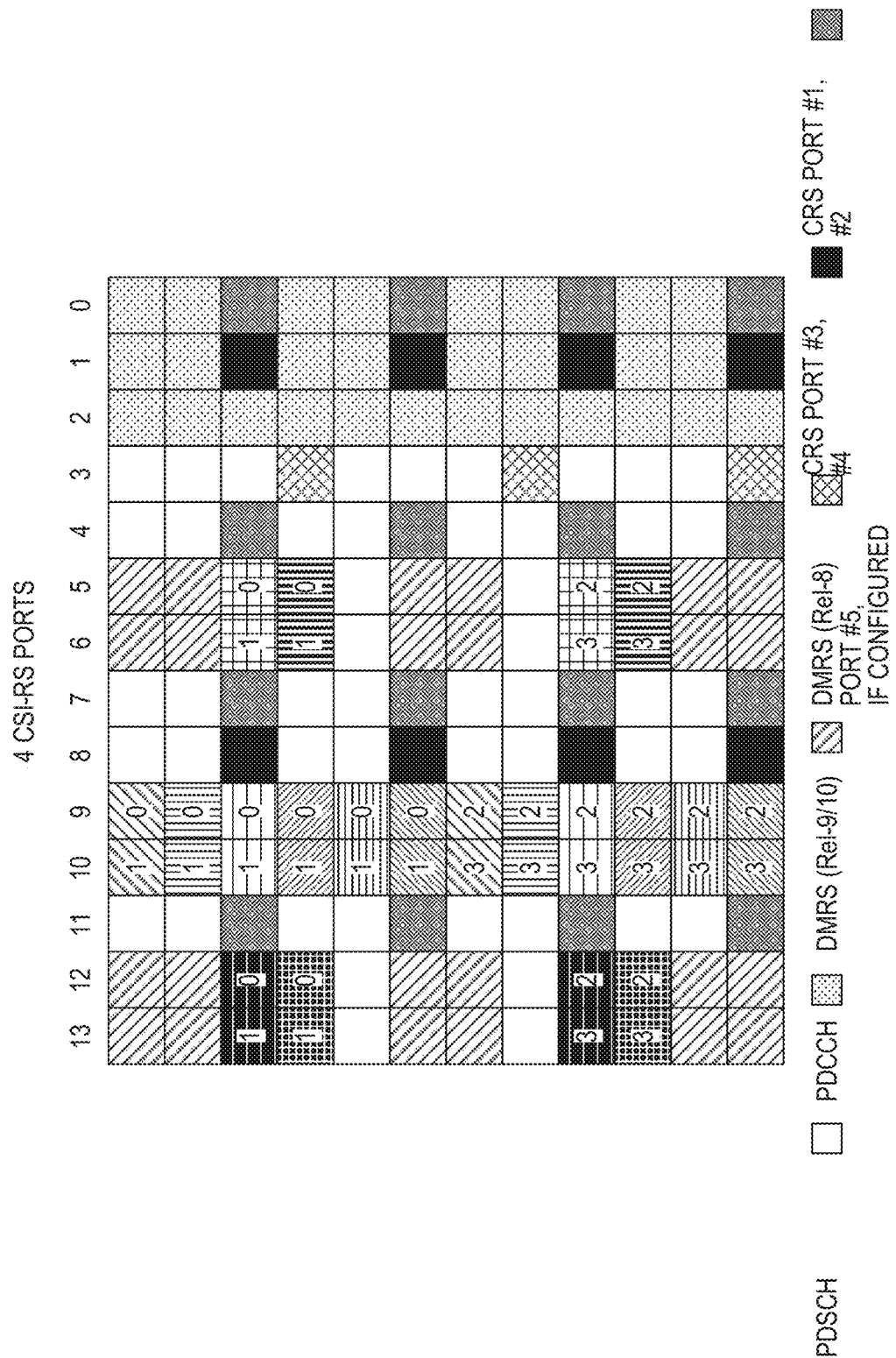
Figure 1C:
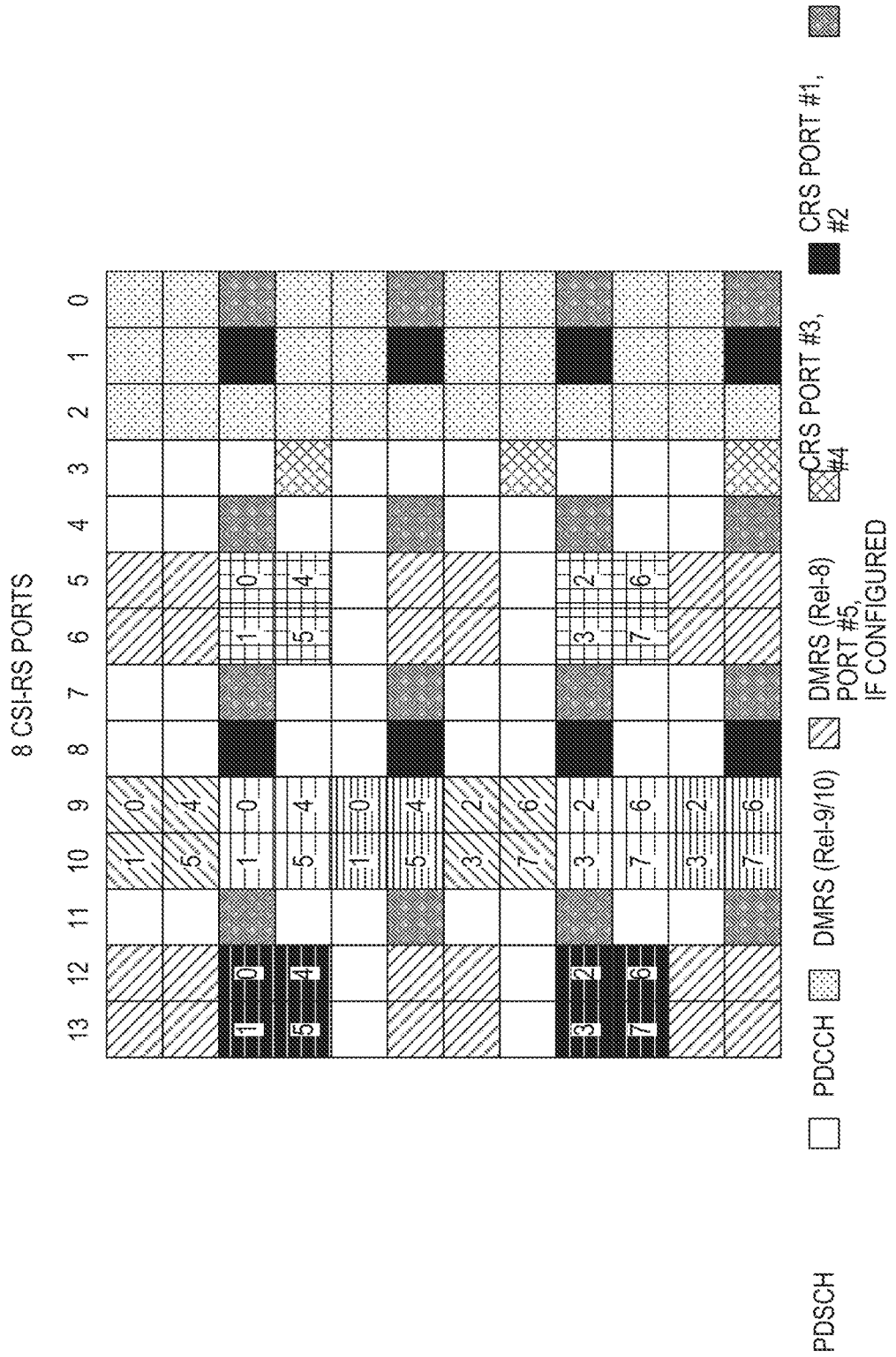
Figure 3:
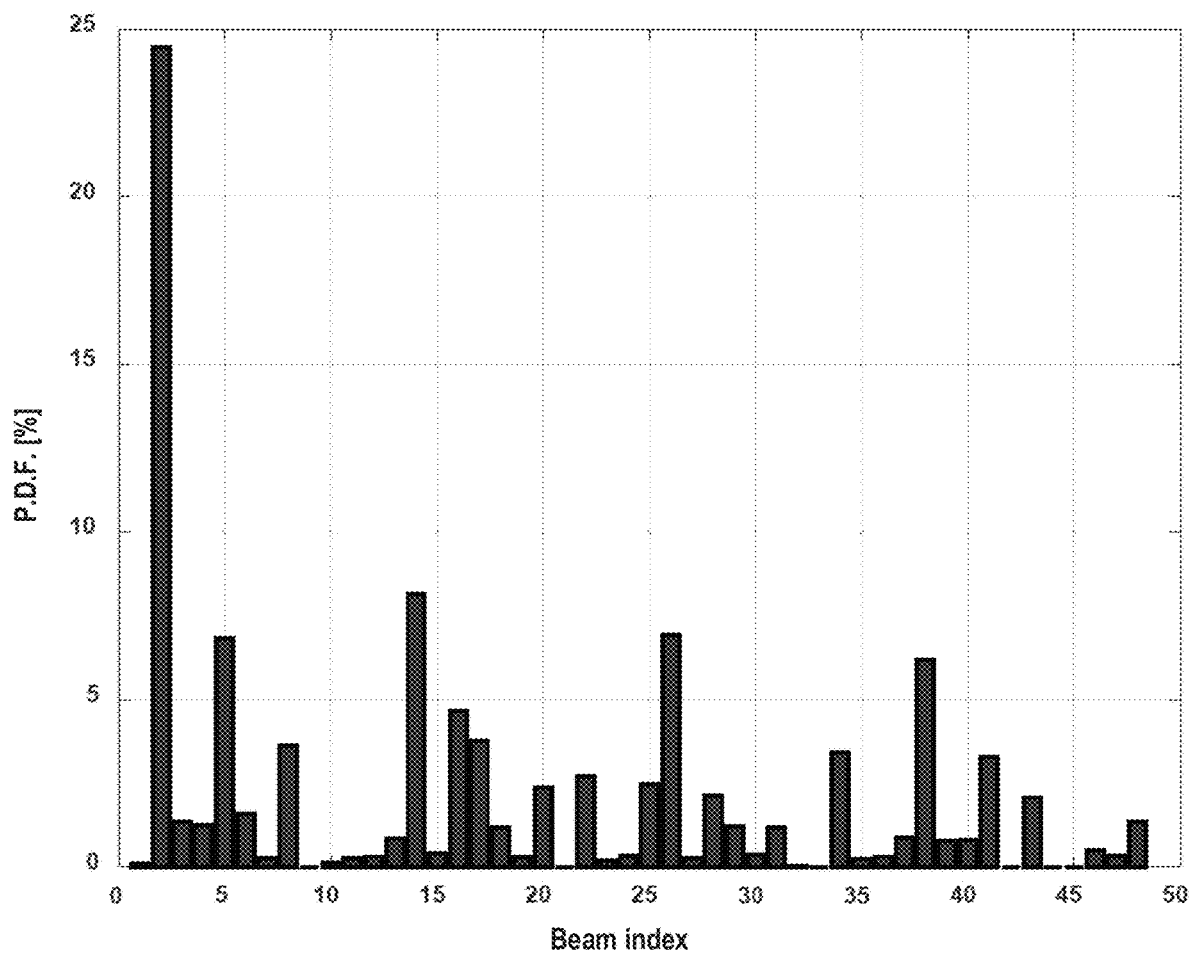
FIG. 3 illustrates an example distribution of selected beams in a cell supporting 48 azimuthal beams.

It has been observed by the inventors, from measurements on many different UE locations in a cell, that beam utilization is not likely to be uniform over the set of possible beams. FIG. 3 illustrates an example distribution of selected beams in a cell supporting 48 azimuthal beams. The probability density function (PDF) is shown for each of the beams that are identified by the beam index. It can be seen from the figure that there are five primary directions that can be identified in this cell. As seen in the example distribution shown in FIG. 3, some beams are very often selected and some very seldom. This has to do with the reflection environment in the covered cell. For example, there may be a building in a certain direction from the gNB, where the building reflects any beam transmitted in that direction towards the UEs in the cell.

Based on this observation, the techniques described herein introduce a restriction in the set of beams that can be simultaneously measured by a UE in the cell is introduced and this is reflected as a tree structure for the signaling. More particularly, the tree structure introduces a restriction as to exactly which combinations of CSI-RS elements can be signaled, with this sacrifice in flexibility being offset by a reduced number of bits being required for the signaling. An example tree structure is shown in FIG. 4, for an example configuration where eight CSI-RS elements of two ports each, i.e., where each CSI-RS element is mapped to two resource elements in the OFDM time-frequency grid.

Figure 4:
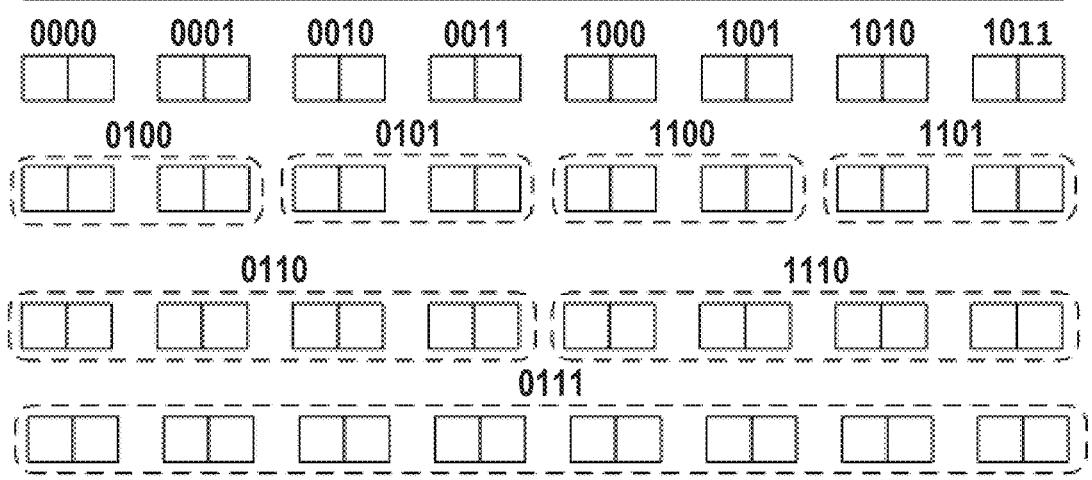
FIG. 4 illustrates an example with 8 CSI-RS elements of 2 ports each, mapped to 2 REs in the physical layer OFDM grid, according to some embodiments.

In the example shown in FIG. 4, the UE can be instructed, with only a four-bit indication sent in the DCI, to measure one or several of a predetermined set of eight CSI-RS elements. Assuming that a different beam is mapped by the gNB to each of the eight different CSI-RS elements (with vertical and horizontal polarizations mapped to the two resource elements per CSI-RS element), this four-bit indication can signal, according to the scheme illustrated in FIG. 4: eight different single-beam assignments; four different two-beam assignments (represented by 0100, 0101, 1100, or 1101); two different four-beam assignments (represented by 0110 or 1110); and one eight-beam assignment (represented by 0111).

It will be appreciated that other groupings of CSI-RS elements are possible. Further, it will be understood that the assignment of specific four-bit indicators to groups in this example is arbitrary. However, the illustrated example is a particularly orderly approach, providing a uniform hierarchy such that a UE can be instructed to measure either one, two, four, or eight CSI-RS elements with a simple four-bit indicator.

The realization that not all beams are equally likely to be used can be utilized in that the gNB can use the eight strongest beams for the single beam indicators (0000, 0001, 0010, 0011, 1000, 1001, 1010, 1011, in the example). These beams point in the "primary" directions and the set of "primary" directions is likely shared by the UEs in the cell but with different orders of received signal strength. Any given UE can then be triggered to measure on a variable 1, 2, 4, 8, . . . beam directions by using this 4-bit DCI. A single beam direction is used to update CSI for a stationary UE, for example, since it is not likely to change its beam direction so frequently. Likewise, a measurement of a large number of beams (such as eight, in this example) can be used to get an update of the relative strengths of the primary beam directions.

Note that if all beams would be equally likely across the served UEs, then a length-N bitmap or a "N choose K" signaling scheme would be needed to indicate the set of beams to measure on, which would require many more DCI bits than this tree based structure.

Figure 5:
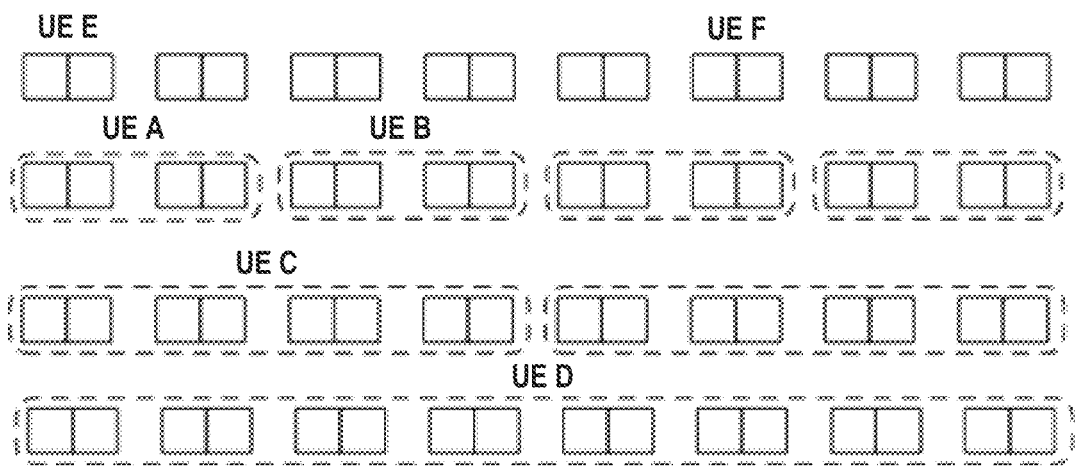
FIG. 5 illustrates an example of sharing of two port CSI-RS elements, according to some embodiments.

FIG. 5 illustrates an example of beam sharing among several UEs, UEs A to E, again based on the example where eight two-port CSI-RS elements are available. As seen in the figure, UE D has been instructed to measure all eight beams, while UE C is instructed to measure only a subset of four beams. UEs A and B in turn measure on two different subsets of those beams that UE C measures, while UE E measures a single beam. UE F shares only a single beam, with UE D, in the measurements. Hence, even though the system has a large number of beams (for example 48), only eight beams are actually used in this measurement instant. Some UEs measure a single or a few of these eight while one UE is measuring all eight.

The illustrative examples of FIGS. 4 and 5 are based on the use of eight two-port CSI-RS elements. The presently disclosed techniques can be extended to any number of elements, and are not limited to the use of two-port CSI-RS elements. More generally, given N available CSI-RS elements, where each comprises one or multiple resource elements mapped to respective ports, a gNB can transmit reference signals on some or all of the N CSI-RS elements and a UE can measure on one, some, or all of the N elements. According to various embodiments, the gNB sends a K-bit identifier, where K<N and where a first subset of the $2^K$ possible values of the identifier each indicate that only a single respective one of the N CSI-RS eleement should be measured, and each value of a second (distinct) subset of the $2^K$ possible values of the identifier indicates a specific combination of two or more CSI-RS elements that should be measured.

In a typical (but not necessarily every) embodiment, the first subset will comprise N different values, so that each one of the N CSI-RS elements can be individually identified. This is the case with the example shown in FIG. 4, for instance.

An N-bit indicator would allow every possible combination of N CSI-RS elements to be signaled. As discussed above, however, this is not necessary, and thus an N-bit indicator would be a wasteful use of signaling resources. With the restriction that K<N, it is apparent that at most one-half of the possible subsets can be signaled, i.e., for the case where K=N−1. However, even this is more than is likely to be necessary, in many systems. Thus, some embodiments of the presently disclosed techniques utilize a K-bit indicator where K=floor($\log_2$ N)+1 or K=ceil($\log_2$ N)+1. (The "floor" function rounds a non-integer value down to the next smallest integer, while the "ceil" function rounds a non-integer value up to the next largest integer.) Typically, but not necessarily, N of these indicator values would be used to indicate individual CSI-RS elements, with the remaining values used to indicate one or more groups of CSI-RS elements. Using K=floor($\log_2$ N)+1 bits ensures that N values are available for this purpose, with at least one left over for signaling a group of CSI-RS elements. Using K=ceil($\log_2$ N)+1 ensures that there are at least 2N values available, so that it is possible to identify N or more groups of CSI-RS elements, in addition to being able to indicate each CSI-RS element individually. In some embodiments, however, K may be some other value that is greater than ceil($\log_2$ N), while still being less than N, allowing room for indicating many groups, but fewer than all of the full enumeration of 2^N arrangements.

In some embodiments, including the example shown in FIG. 4, N is a power of 2, and $\log_2$ N+1 bits are used for the identifier, with N of the values for the identifier corresponding to single CSI-RS elements. The remaining N values can each be mapped to a combination of CSI-RS elements. In the illustrated example, this is an orderly mapping and hierarchical grouping, where N indicator values uniquely indicate single CSI-RS elements, N/2 indicator values uniquely identify groups of two CSI-RS elements, N/4 indicator values uniquely identify groups of four CSI-RS elements, etc., but the grouping and mapping can be arbitrary, in some embodiments, so long as both the gNBs and the UEs agree on the mapping of indicator values to CSI-RS elements and CSI-RS element groups.

In discussions of NR, the use of a 32-port CSI-RS resource is a working assumption. The below discussion describes how the present techniques may be applied to this use case.

Figure 6:
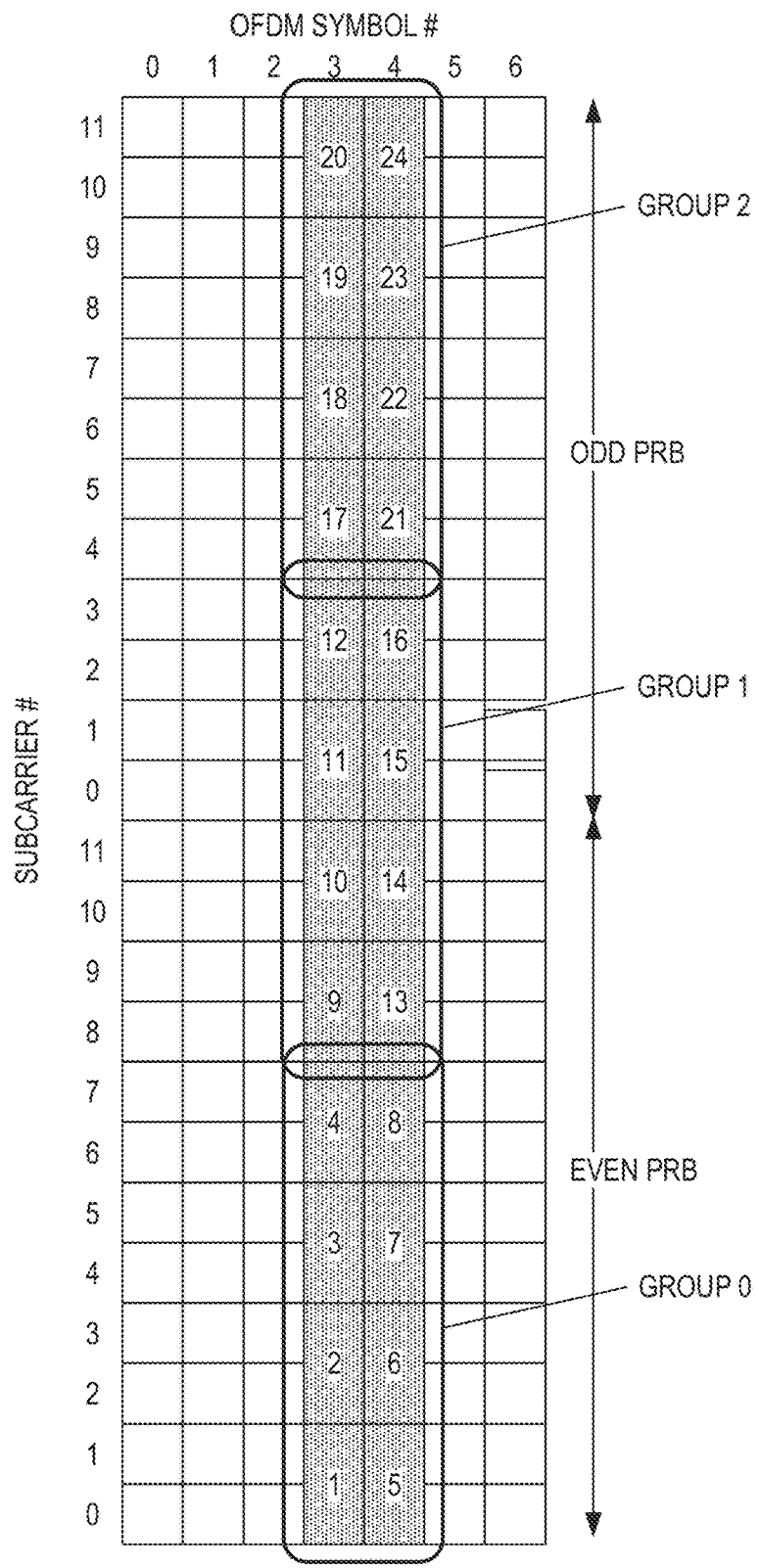
FIG. 6 illustrates a grouping of CSI-RS elements into groups of 8, according to some embodiments.

Two-port CSI-RS elements, as discussed above, may be further grouped into groups of eight elements mapped across two OFDM symbols, preferably consecutive OFDM symbols. Each such group then contains 16 ports and three such groups can be mapped to two resource blocks (i.e., 2×12=24 subcarriers). This is shown in FIG. 6.

Given this mapping, the same tree structure as shown above in FIG. 4 can be used within each one of these groups of eight two-port CSI-RS elements, such that a 4-bit indicator can be used to identify a CSI-RS element within a group. Additional DCI signaling is used to indicate the group. Note that two bits are required to distinguish among three groups.

A 32-port aggregated resource can be obtained by indicating two such groups. The two RBs shown in FIG. 6 can then be repeated across the desired measurement bandwidth, hence each port is measured once per two RBs in this example.

Since the signaling is dynamic in the DCI, it is possible to signal a single CSI-RS element (two ports) as well as a four-port, eight-port, 16-port, or 32-port CSI-RS resource by using this type of compressed and tree-based/hierarchical signaling structure. Note that six bits are needed in this example.

Several approaches are possible for feedback signaling, i.e., where the UE reports its measurements and identifies one or more of the measured CSI-RS elements. In some embodiments, the signaling payload is kept independent on the number S of CSI-RS elements indicated to the UE to measure on, which according to some embodiments can vary according to 1, 2, 4, 8, . . . .

In one example, the UE selects one out of S, where S is the number of CSI-RS eleemnts that are measured, as implicitly indicated by the DCI used to trigger the CSI measurement and/or CSI report. An indicator of of length M=ceil($\log_2$ S) (or $\lceil \log_2 S \rceil$) is signaled from the UE to the gNB, to point out which one of the N CSI-RS elements (or beams) the report is referring to, together with the measurement result. Alternatively, the indicator length M is chosen to be equal to ceil($\log_2$ $S_{MAX}$), where $S_{MAX}$ is the maximum number of CSI-RS elements that can be measured (eight, in the example shown in FIG. 4). With this approach, the payload size is independent of S.

In another example, the UE selects Q out of S CSI-RS measurements to report, where N is implicitly indicated by the DCI used to trigger the CSI measurement and/or CSI report. An indicator is signaled from the UE to gNB, to point out which Q out of the S CSI-RS elements (or beams) the report is referring to, together with the Q measurement results. Alternatively, a bitmap length is chosen for this indicator so that the largest combination of Q and S can always be covered, to make the signaling payload size independent of Q and N. The benefit of this embodiment is that the feedback control channel design and reception at the gNB is less complex if the payload is kept constant or similar. Moreover, the transmit power of the UE (which depends on the payload) is more stable.

It will be appreciated that the minimum time between the trigger of the measurement from gNB to UE and the sending of the CSI report from the UE to the gNB may depend on the DCI field that indicates the CSI resources. In some embodiments, if the indication indicates many ports (such as 0111 in the example above), then a predetermined parameter $n_{0111}$ may denote the number of subframes after which the report can be transmitted. Alternatively, if dynamic CSI report triggering is used, the gNB may request the UE to report not earlier than $n_{0111}$ subframes later. This can be captured in specifications as a table, which maps each DCI triggering field value X (e.g., in the binary range from 0000 to 1111) to a minimum subframe delay $n_X$. A possible benefit from this approach is that the UE is allowed more time if the UE has to perform many measurements. If there is a single CSI-RS measurement, the processing time can be very short, and the UE may implicitly be assigned to transmit the report in the same subframe as the CSI-RS is transmitted, in some embodiments.

It will be appreciated that the techniques and apparatuses described herein are especially applicable to recent technology trends that are of particular interest in a 5G NR context. These techniques are, however, also applicable in further development of the existing mobile broadband systems such as WCDMA and LTE.

Figure 7:
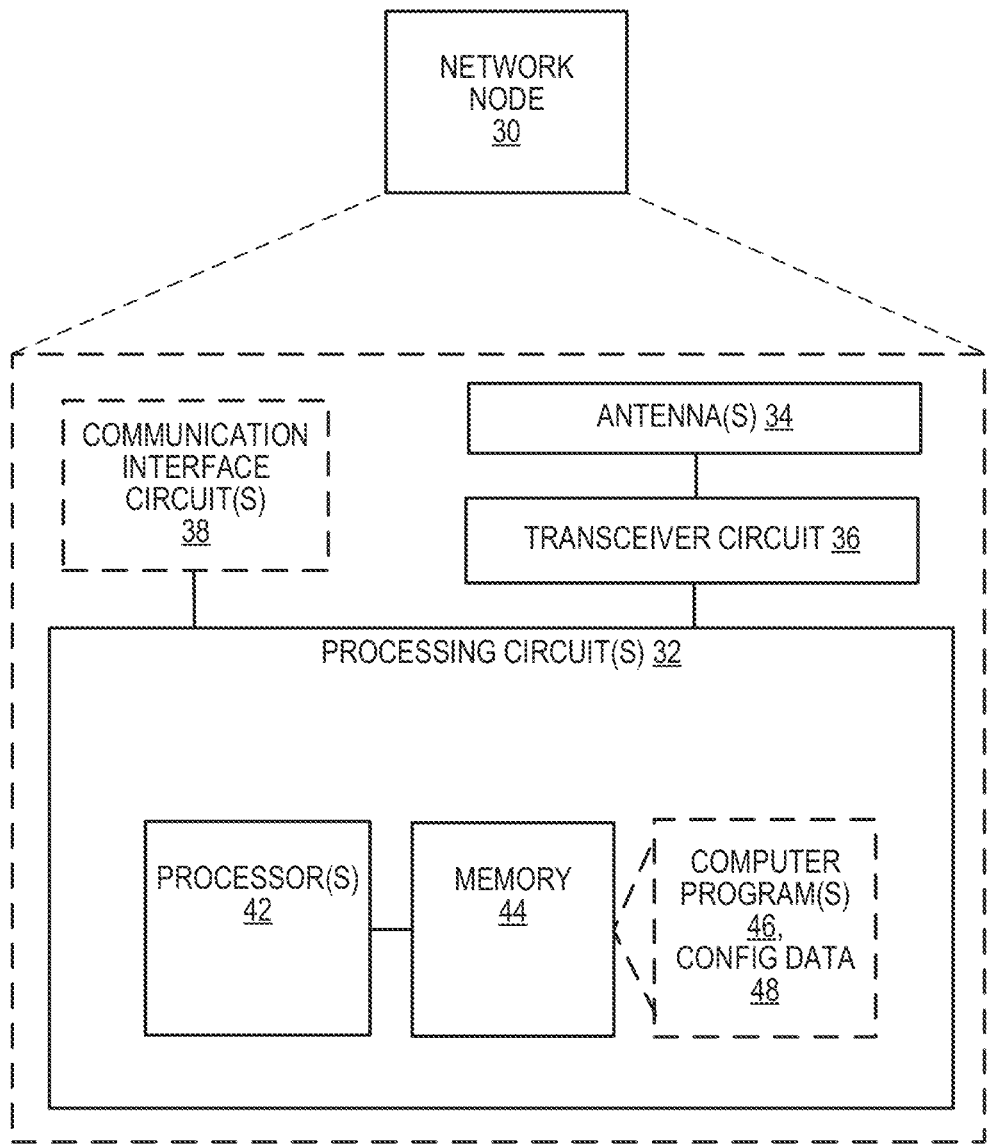
FIG. 7 is a block diagram illustrating one of one or more nodes of a wireless communication network, according to some embodiments.

FIG. 7 illustrates a diagram of a node, such as network node 30, which may be one of one or more nodes of a wireless communication network that work individually or collectively to perform the network side embodiments described herein. The network node 30 may be, for example, a network access node such as a base station or gNodeB (in the 5G NR context). The network node 30 provides an air interface to a wireless device, e.g., a 5G air interface for downlink transmission and uplink reception, which is implemented via antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication, or WLAN services if necessary. According to various embodiments, cellular communication services may be operated according to 5G. However, this does not preclude the network node 30 from also being configured to handle communications in any one or more of other 3GPP cellular standards, GSM, GPRS, WCDMA, HSDPA, LTE and LTE-Advanced, if appropriate. The network node 30 may also include communication interface circuits 38 for communicating with nodes in the core network, other peer radio nodes, and/or other types of nodes in the network.

The network node 30 also includes one or more processing circuits 32 that are operatively associated with and configured to control the communication interface circuit(s) 38 and/or the transceiver circuit 36. The processing circuit 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any combination thereof. More generally, the processing circuit 32 may comprise fixed circuitry, or programmable circuitry that is specially configured via the execution of program instructions implementing the functionality taught herein, or may comprise some combination of fixed and programmable circuitry. The processor(s) 42 may be multi-core. The processing circuit or circuits 32 of one or more network nodes 30 (and possibly other controlling nodes) considered together may also be referred to as processing circuitry. Likewise, the transceiver circuits of the one or more network nodes together can be referred to as transceiver circuitry. However, for convenience, reference will be made to the processing circuit 32 and the transceiver circuit 36 of a single network node 30.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any combination thereof. By way of non-limiting example, the memory 44 may comprise any one or more of SRAM, DRAM, EEPROM, and FLASH memory, which may be in the processing circuit 32 and/or separate from the processing circuit 32. In general, the memory 44 comprises one or more types of computer-readable storage media providing non-transitory storage of the computer program 46 and any configuration data 48 used by the node 30. Here, "non-transitory" means permanent, semi-permanent, or at least temporarily persistent storage and encompasses both long-term storage in non-volatile memory and storage in working memory, e.g., for program execution.

In some embodiments, the network node 30 is configured to operate as one of one or more network nodes of a wireless communication network for controlling the measurement of CSI-RS elements in a wireless communication network. Accordingly, in some embodiments, the processing circuit 32 is configured to transmit CSI-RS symbols in each of one or more of N CSI-RS elements, each CSI-RS element in the set corresponding to at least one resource element in a time-frequency grid of resource elements. The processing circuit 32 is configured to select, from the N CSI-RS elements, a first set of CSI-RS elements to be measured by a first wireless device, the first set comprising one or several of the N CSI-RS elements and transmit, to the first wireless device, a message comprising a first K-bit indicator identifying the first set of CSI-RS elements, wherein K<N. The processing circuit 32 is also configured to receive, from the first wireless device, in response to the message, a measurement report corresponding to at least one of the first set of CSI-RS elements. The first K-bit indicator is one of a predetermined set of K-bit indicators, where each member of the predetermined set of K-bit indicators uniquely corresponds to a CSI-RS element or group of CSI-RS elements from among the N CSI-RS, according to a predetermined mapping, such that each member of a first subset of the predetermined set of K-bit indicators uniquely indicates a single one of the N CSI-RS elements and such that each member of a second subset of the predetermined indicators uniquely indicates a predetermined group of two or more of the N CSI-RS elements. This predetermined mapping may be defined by industry standard, for example, such that the network node (e.g., gNB) and wireless device are programmed or hardcoded with the predetermined mapping prior to being used. However, the predetermined mapping may also be more dynamic in nature, e.g., such that network signaling indicates which of a set of predetermined mappings is applicable at any given time, or such that the wireless device is configured with all or part of the predetermined mapping via over-the-air signaling.

Figure 8:
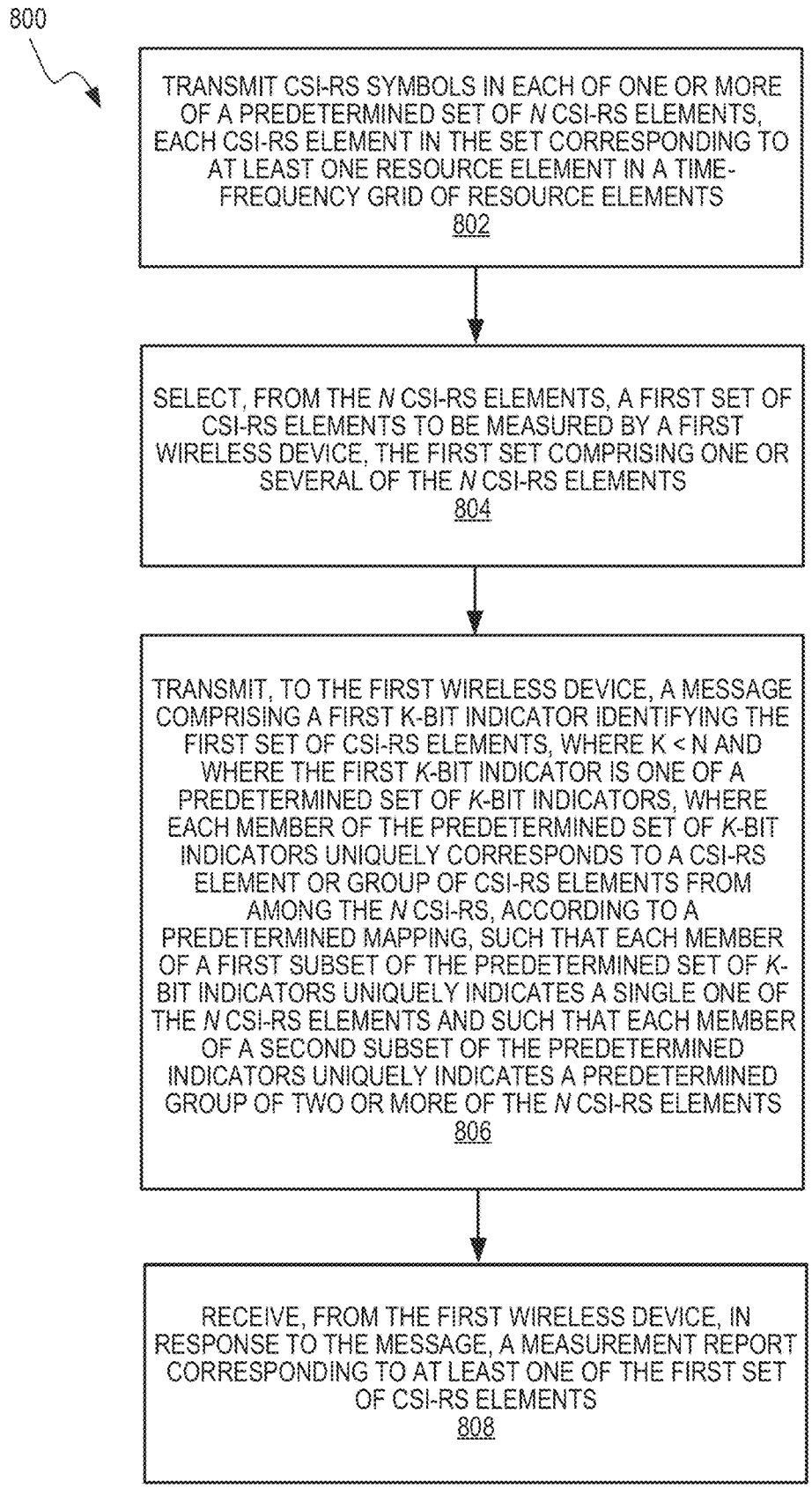
FIG. 8 is a process flow diagram showing an example method performed by the one or more nodes, according to some embodiments.

Regardless of its specific implementation details, the processing circuit 32 of the network node 30 is configured to perform (possibly in coordination with other nodes) a method according to one or more of the techniques described above, such as method 800 of FIG. 8. The method 800 includes transmitting CSI-RS symbols in each of one or more of N CSI-RS elements, each CSI-RS element in the set corresponding to at least one resource element in a time-frequency grid of resource elements (block 802). The method 800 includes selecting, from the N CSI-RS elements, a first set of CSI-RS elements to be measured by a first wireless device, the first set comprising one or several of the N CSI-RS elements (block 804). The method 800 also includes transmitting, to the first wireless device, a message comprising a first K-bit indicator identifying the first set of CSI-RS elements, wherein K<N (block 806). The method 800 further includes receiving, from the first wireless device, in response to the message, a measurement report corresponding to at least one of the first set of CSI-RS elements (block 808). The first K-bit indicator is one of a predetermined set of K-bit indicators, where each member of the predetermined set of K-bit indicators uniquely corresponds to a CSI-RS element or group of CSI-RS elements from among the N CSI-RS, according to a predetermined mapping, such that each member of a first subset of the predetermined set of K-bit indicators uniquely indicates a single one of the N CSI-RS elements and such that each member of a second subset of the predetermined indicators uniquely indicates a predetermined group of two or more of the N CSI-RS elements. In some cases, K=ceil($\log_2$ N)+1.

Each of the N CSI-RS elements may comprise a pair of resource elements in an OHM resource element grid, and transmitting CSI-RS symbols in each of the one or more of the N CSI-RS elements may include transmitting in one of the pair of resource elements with a first antenna polarization and transmitting in the other of the pair of resource elements with a second antenna polarization, the second antenna polarization being substantially orthogonal to the first.

In some cases, the base station may map specific beams to CSI-RS elements. Accordingly, transmitting CSI-RS symbols in each of the one or more of the N CSI-RS elements includes transmitting a beamformed CSI-RS symbol in at least one of the CSI-RS elements. Transmitting CSI-RS symbols in each of the one or more of the N CSI-RS elements may include transmitting beamformed CSI-RS symbols in each of N CSI-RS elements, such that each CSI-RS element corresponds to a different transmit beam. The method 800 may further include selecting N transmit beams from a set of B available beams, where B>N, and wherein each CSI-RS element corresponds to a different one of the selected transmit beams. The selection of the N transmit beams may be based on previously received measurement reports, and the selected beams may include at least one beam from each of a plurality of angularly spaced apart primary beam directions, the primary directions being determined from the previously received measurement reports.

As to the hierarchical tree pattern of the signaling, the first subset of the predetermined set of K-bit indicators may consist of N indicators, each uniquely indicating a single one of the N CSI-RS elements. In some cases, N is a power of 2, and $K=\log_2 N+1$. The first subset of the predetermined set of K-bit indicators may consist of N indicators, each uniquely indicating a single one of the N CSI-RS elements, and the second subset may include N/2 indicators that each uniquely identify a group of two CSI-RS elements from the N CSI-RS elements. In some cases, such as when K≥8, the second subset may further include N/4 indicators that each uniquely identify a group of four CSI-RS elements from the N CSI-RS elements. This pattern may continue, of course, consistent with the binary tree approach described herein.

The second subset may include one indicator that indicates that all N CSI-RS elements are to be measured. The message comprising the K-bit indicator may be a DCI message.

The method 800 may include selecting, from the N CSI-RS elements, a second set of CSI-RS elements to be measured by a second wireless device in an interval of time that at least partly overlaps an interval of time in which the first wireless device is measuring the first set of CSI-RS elements, the second set comprising one or several of the N CSI-RS elements and differing from the first set. The method 800 may further include transmitting, to the second wireless device, a message comprising a second K-bit indicator identifying the second set of CSI-RS elements, wherein the second K-bit indicator is one of the predetermined set of K-bit indicators. The method 800, in this case, may include receiving, from the second wireless device, in response to the message, a measurement report corresponding to at least one of the second set of CSI-RS elements. The first K-bit indicator may indicate a first group of two or more of the N CSI-RS elements and the second K-bit indicator may indicate a second group of two or more the N CSI-RS elements, the first and second groups being mutually exclusive.

With regard to any feedback signaling, the measurement report received from the first wireless device comprises, in some cases, an M-bit indicator indicating one of the CSI-RS elements in the first set of CSI-RS elements, where M equals ceil($\log_2$ S) and S equals the number of members in the first set of CSI-RS elements. In other cases, the measurement report received from the first wireless device comprises an M-bit indicator indicating one of the CSI-RS elements in the first set of CSI-RS elements, where M equals ceil($\log_2 S_{MAX}$) and $S_{MAX}$ equals the maximum number of members in any one of the predetermined groups of two or more of the N CSI-RS elements that can be indicated with the predetermined set of K-bit indicators.

In some cases, the measurement report received from the first wireless device comprises an M-bit indicator indicating one of the CSI-RS elements in the first set of CSI-RS elements, where M equals ceil($\log_2$ S) and S equals the number of members in the first set of CSI-RS elements. In some cases, the measurement report comprises measurement data for Q of the CSI-RS elements, where 1<Q<S, S being the number of members in the first set of CSI-RS elements, and wherein the measurement report further includes an indicator identifying which Q of the S members in the first of CSI-RS elements are represented in the measurement report.

Figure 9:
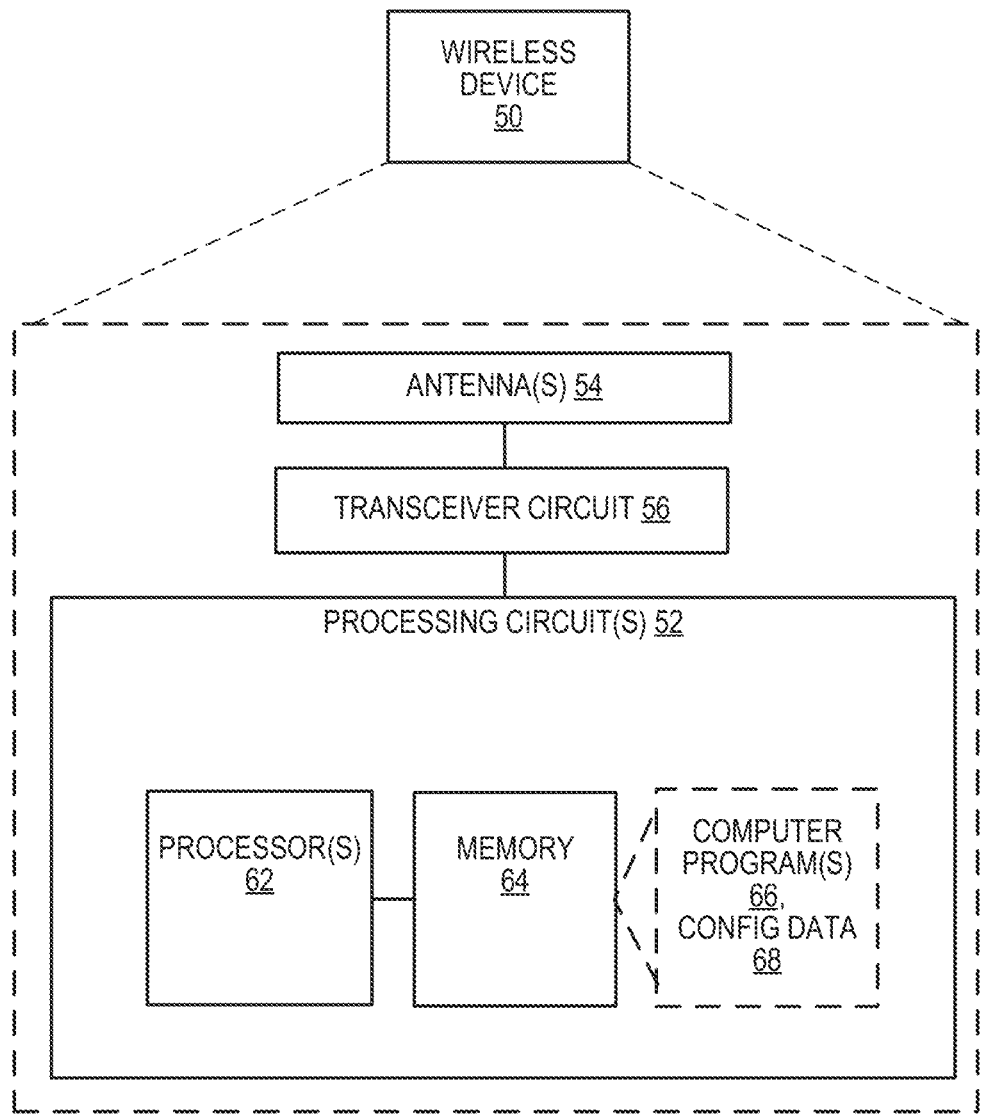
FIG. 9 is a block diagram illustrating a wireless device, according to some embodiments.

FIG. 9 illustrates an example wireless device 50 (e.g., UE) that is configured to perform the techniques described herein for the wireless device. The wireless device 50 may also be considered to represent any wireless devices that may operate in a network, such as a 5G network. The wireless device 50 herein can be any type of wireless device capable of communicating with a network node or another UE over radio signals. The wireless device 50 may also be referred to, in various contexts, as a radio communication device, a target device, a device-to-device (D2D) UE, a machine-type UE or UE capable of machine to machine (M2M) communication, a sensor-equipped UE, a PDA (personal digital assistant), a wireless tablet, a mobile terminal, a smart phone, laptop-embedded equipment (LEE), laptop-mounted equipment (LME), a wireless USB dongle, a Customer Premises Equipment (CPE), etc.

The wireless device 50 communicates with one or more radio nodes or base stations, such as one or more network nodes 30, via antennas 54 and a transceiver circuit 56. The transceiver circuit 56 may include transmitter circuits, receiver circuits, and associated control circuits that are collectively configured to transmit and receive signals according to a radio access technology, for the purposes of providing cellular communication services.

The wireless device 50 also includes one or more processing circuits 52 that are operatively associated with and control the radio transceiver circuit 56. The processing circuit 52 comprises one or more digital processing circuits, e.g., one or more microprocessors, microcontrollers, DSPs, FPGAs, CPLDs, ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50.

Accordingly, in some embodiments, the processing circuit 52 of the wireless device 50 is configured to measure CSI-RS of a wireless communication network. The processing circuit 52 is configured to receive, from the wireless communication network, a message comprising a first K-bit indicator and use the first K-bit indicator to identify a first set of CSI-RS from N CSI-RS elements, wherein each CSI-RS element corresponds to at least one resource element in a time-frequency grid of resource elements and wherein K<N. The processing circuit 52 is configured to perform measurements on the identified first set of CSI-RS elements and send, to the wireless communications network, a measurement report corresponding to at least one of the first set of CSI-RS elements. The first K-bit indicator is one of a predetermined set of K-bit indicators, where each member of the predetermined set of K-bit indicators uniquely corresponds to a CSI-RS element or group of CSI-RS elements from among the N CSI-RS, according to a predetermined mapping, such that each member of a first subset of the predetermined set of K-bit indicators uniquely indicates a single one of the N CSI-RS elements and such that each member of a second subset of the predetermined indicators uniquely indicates a predetermined group of two or more of the N CSI-RS elements.

Figure 10:
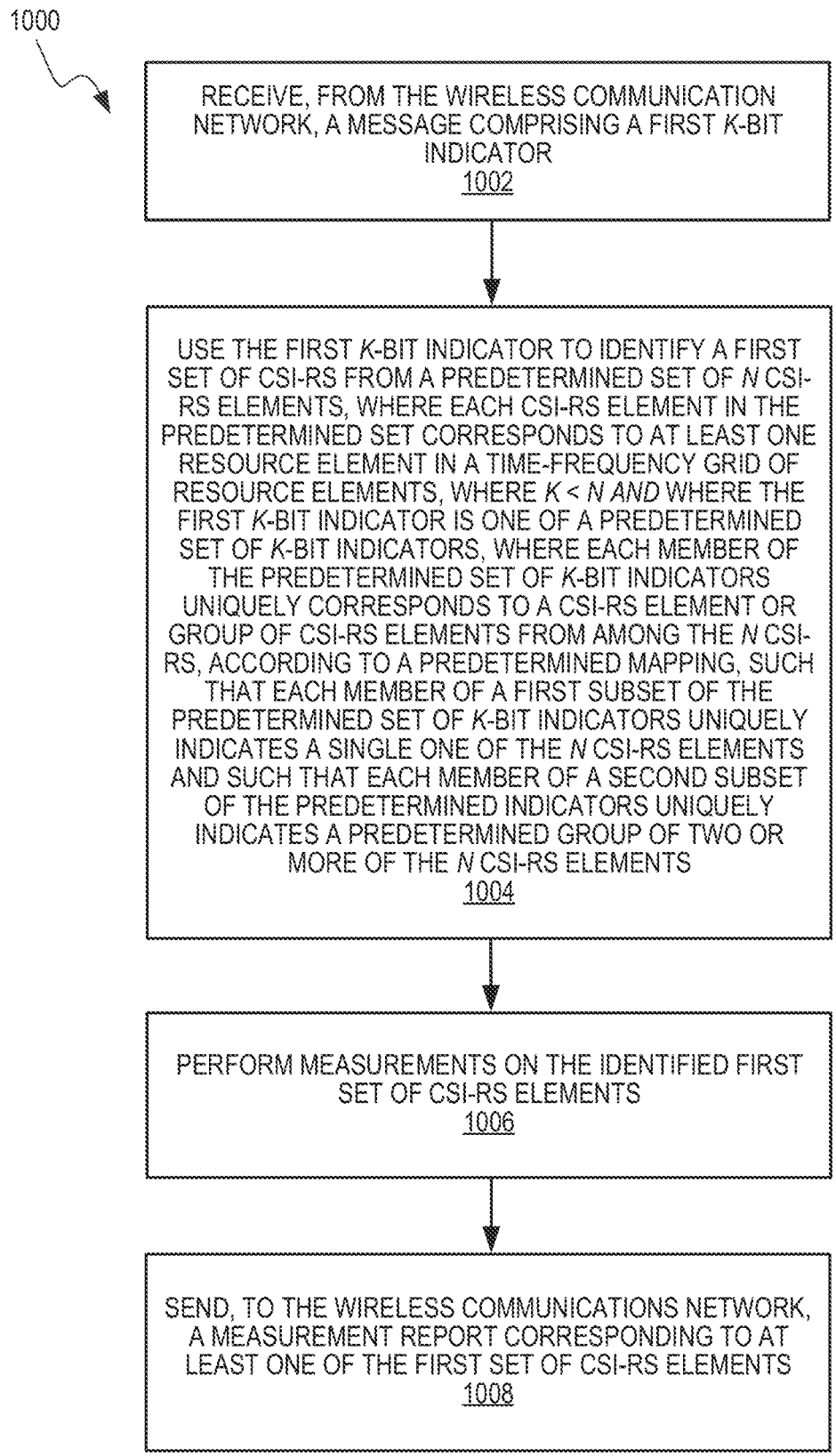
FIG. 10 is a process flow diagram showing an example method performed by the wireless device, according to some embodiments.

Regardless of its specific implementation details, the processing circuit 52 of the wireless device 50 is configured to perform a method according to one or more of the techniques described, such as method 1000 of FIG. 10. The method 1000 includes receiving, from the wireless communication network, a message comprising a first K-bit indicator (block 1002) and using the first K-bit indicator to identify a first set of CSI-RS from N CSI-RS elements, wherein each CSI-RS element corresponds to at least one resource element in a time-frequency grid of resource elements and wherein K<N (block 1004). The method 1000 also includes performing measurements on the identified first set of CSI-RS elements (block 1006) and sending, to the wireless communications network, a measurement report corresponding to at least one of the first set of CSI-RS elements (block 1008). The first K-bit indicator is one of a predetermined set of K-bit indicators, where each member of the predetermined set of K-bit indicators uniquely corresponds to a CSI-RS element or group of CSI-RS elements from among the N CSI-RS, according to a predetermined mapping, such that each member of a first subset of the predetermined set of K-bit indicators uniquely indicates a single one of the N CSI-RS elements and such that each member of a second subset of the predetermined indicators uniquely indicates a predetermined group of two or more of the N CSI-RS elements. In some cases, $K=\mathrm{ceil}(\log_2 N)+1$.

Each of the N CSI-RS elements may comprise a pair of resource elements in an OFDM resource element grid, and where, for each CSI-RS element a CSI-RS symbol is transmitted in one of the pair of resource elements with a first antenna polarization and a CSI-RS is transmitted in the other of the pair of resource elements with a second antenna polarization, the second antenna polarization being substantially orthogonal to the first, and the method 1000 may include performing measurements on the identified first set of CSI-RS elements comprises, for each CSI-RS element, combining measurements of the pair of resource elements.

The first subset of the predetermined set of K-bit indicators may consist of N indicators, each uniquely indicating a single one of the N CSI-RS elements.

In some cases, N is a power of 2, and $K=\log_2 N+1$. The first subset of the predetermined set of K-bit indicators may consist of N indicators, each uniquely indicating a single one of the N CSI-RS elements, and wherein the second subset includes N/2 indicators that each uniquely identify a group of two CSI-RS elements from the N CSI-RS elements. In cases where K≥8, the second subset further includes N/4 indicators that each uniquely identify a group of four CSI-RS elements from the N CSI-RS elements.

The second subset may include one indicator that indicates that all N CSI-RS elements are to be measured. The message may comprise the K-bit indicator is a DCI message.

The method 1000 may include, in the measurement report sent to the wireless communications network, an M-bit indicator indicating one of the CSI-RS elements in the first set of CSI-RS elements, where M equals $\mathrm{ceil}(\log_2 S)$ and S equals the number of members in the first set of CSI-RS elements. The method 1000 may include, in the measurement report sent to the wireless communications network, an M-bit indicator indicating one of the CSI-RS elements in the first set of CSI-RS elements, where M equals $\mathrm{ceil}(\log_2 S_{MAX})$ and $S_{MAX}$ equals the maximum number of members in any one of the predetermined groups of two or more of the N CSI-RS elements that can be indicated with the predetermined set of K-bit indicators.

The method 1000 may include, in the measurement report sent to the wireless communications network, an M-bit indicator indicating one of the CSI-RS elements in the first set of CSI-RS elements, where M equals $\mathrm{ceil}(\log_2 S)$ and S equals the number of members in the first set of CSI-RS elements. The method 1000 may include, in the measurement report sent to the wireless communications network, measurement data for Q of the CSI-RS elements, where 1<Q<S, S being the number of members in the first set of CSI-RS elements, and further including in the measurement report an indicator identifying which Q of the S members in the first of CSI-RS elements are represented in the measurement report. As discussed in detail above, the techniques described herein, e.g., as illustrated in the process flow diagrams of FIGS. 8 and 10, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 11:
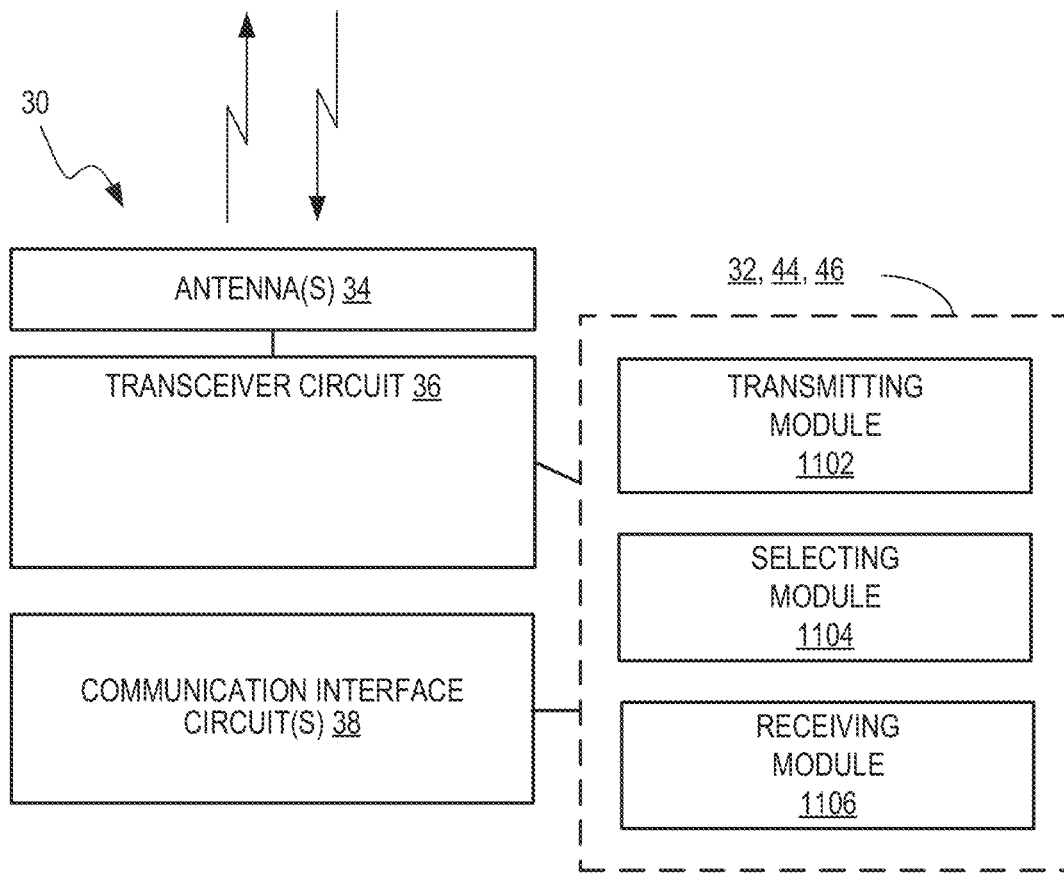
FIG. 11 is a block diagram of a functional implementation of one or more nodes of a wireless communication network, according to some embodiments.

FIG. 11 illustrates an example functional module or circuit architecture as may be implemented in a network node 30 operating as one or more nodes of a wireless communication network configured to control the measurement of CSI-RS elements in the wireless communication network. The implementation includes a transmitting module 1102 for transmitting CSI-RS symbols in each of one or more of N CSI-RS elements, each CSI-RS element in the set corresponding to at least one resource element in a time-frequency grid of resource elements. The implementation also includes a selecting module 1104 for selecting, from the N CSI-RS elements, a first set of CSI-RS elements to be measured by a first wireless device, the first set comprising one or several of the N CSI-RS elements. The transmitting module 1102 is also for transmitting, to the first wireless device, a message comprising a first K-bit indicator identifying the first set of CSI-RS elements, wherein K<N. The implementation also includes a receiving module 1106 for receiving, from the first wireless device, in response to the message, a measurement report corresponding to at least one of the first set of CSI-RS elements. The first K-bit indicator is one of a predetermined set of K-bit indicators, where each member of the predetermined set of K-bit indicators uniquely corresponds to a CSI-RS element or group of CSI-RS elements from among the N CSI-RS, according to a predetermined mapping, such that each member of a first subset of the predetermined set of K-bit indicators uniquely indicates a single one of the N CSI-RS elements and such that each member of a second subset of the predetermined indicators uniquely indicates a predetermined group of two or more of the N CSI-RS elements.

Figure 12:
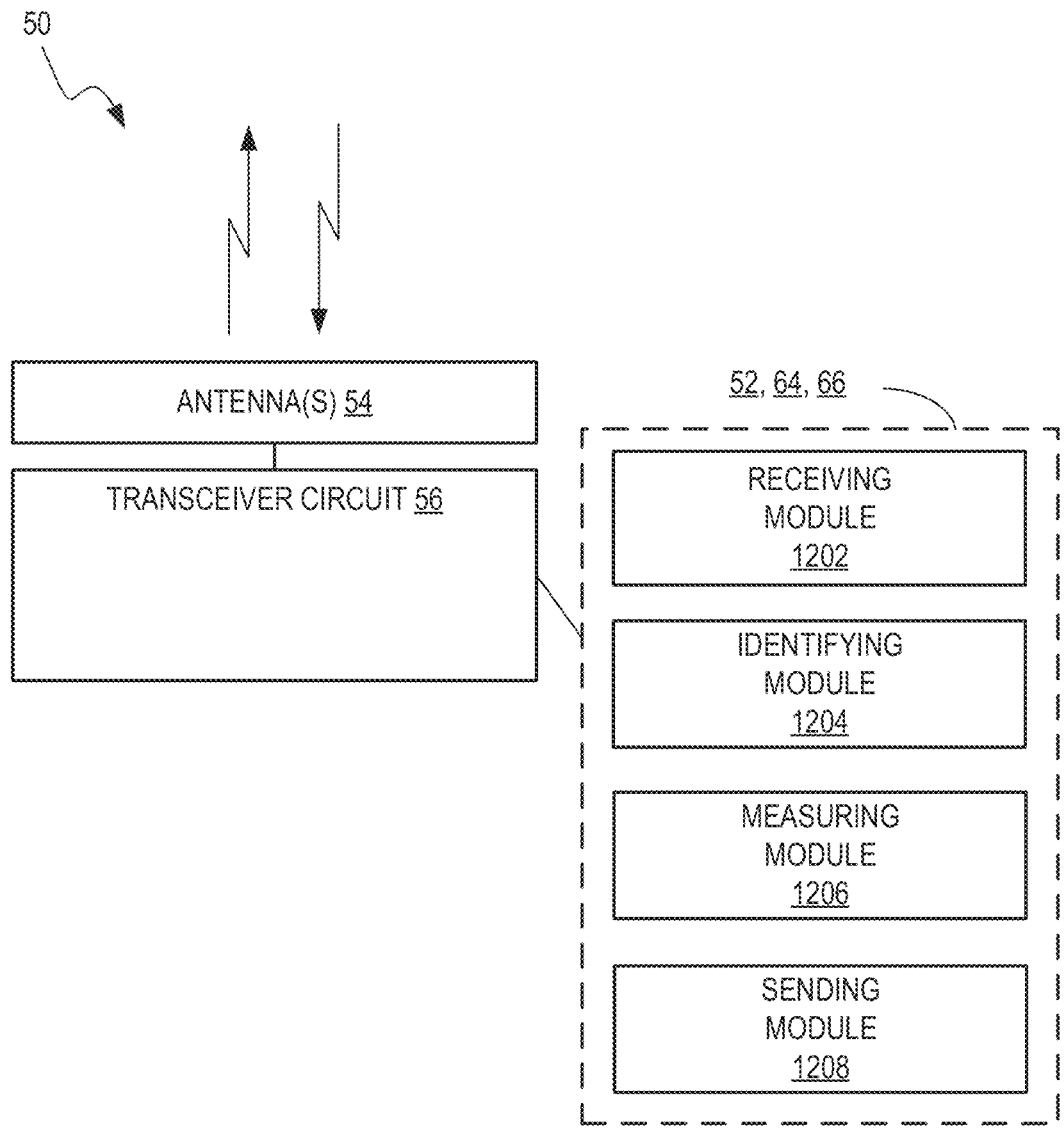
FIG. 12 is a block diagram of a functional implementation of a wireless device, according to some embodiments.

FIG. 12 illustrates an example functional module or circuit architecture as may be implemented in a wireless device 50 configured to measure CSI-RS elements in a wireless communication network. The implementation includes a receiving module 1202 for receiving, from the wireless communication network, a message comprising a first K-bit indicator and an identifying module 1204 for using the first K-bit indicator to identify a first set of CSI-RS from N CSI-RS elements, wherein each CSI-RS element corresponds to at least one resource element in a time-frequency grid of resource elements and wherein K<N. The implementation also includes a measuring module 1206 for performing measurements on the identified first set of CSI-RS elements and a sending module 1208 for sending, to the wireless communications network, a measurement report corresponding to at least one of the first set of CSI-RS elements. The first K-bit indicator is one of a predetermined set of K-bit indicators, where each member of the predetermined set of K-bit indicators uniquely corresponds to a CSI-RS element or group of CSI-RS elements from among the N CSI-RS, according to a predetermined mapping, such that each member of a first subset of the predetermined set of K-bit indicators uniquely indicates a single one of the N CSI-RS elements and such that each member of a second subset of the predetermined indicators uniquely indicates a predetermined group of two or more of the N CSI-RS elements.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method for controlling the measurement of channel-state information reference signal (CSI-RS) elements in a wireless communication network, the method comprising, in one or more nodes of the wireless communication network:
transmitting, to a first wireless device, a message comprising a first K-bit indicator identifying a first set of CSI-RS elements selected from N transmitted CSI-RS elements, wherein K<N; and
receiving, from the first wireless device, in response to the message, a measurement report corresponding to at least one of the first set of CSI-RS elements,
wherein the first K-bit indicator is one of a predetermined set of K-bit indicators, where each member of the predetermined set of K-bit indicators uniquely corresponds to a CSI-RS element or group of CSI-RS elements from among the N CSI-RS, according to a predetermined mapping, such that each member of a first subset of the predetermined set of K-bit indicators uniquely indicates a single one of the N CSI-RS elements, the first subset comprising N indicators, and such that each member of a second subset of the predetermined indicators uniquely indicates a predetermined group of two or more of the N CSI-RS elements.

2. The method of claim 1, wherein K>ceil($\log_2$ N) or K=ceil($\log_2$ N)+1.

3. The method of claim 1, wherein each of the N CSI-RS elements comprises a pair of resource elements in an Orthogonal Frequency-Division Multiplexing (OFDM) resource element grid.

4. The method of claim 1, wherein N is a power of 2, and K=$\log_2$ N+1, wherein the first subset of the predetermined set of K-bit indicators consists of N indicators, each uniquely indicating a single one of the N CSI-RS elements, and wherein the second subset includes N/2 indicators that each uniquely identify a group of two CSI-RS elements from the N CSI-RS elements.

5. The method of claim 1, further comprising:
transmitting, to a second wireless device, a message comprising a second K-bit indicator identifying a second set of CSI-RS elements among the N CSI-RS elements to be measured by the second wireless device in an interval of time that at least partly overlaps an interval of time in which the first wireless device is measuring the first set of CSI-RS elements, wherein the second K-bit indicator is one of the predetermined set of K-bit indicators; and
receiving, from the second wireless device, in response to the message, a measurement report corresponding to at least one of the second set of CSI-RS elements.

6. The method of claim 5, wherein the first K-bit indicator indicates a first group of two or more of the N CSI-RS elements and the second K-bit indicator indicates a second group of two or more the N CSI-RS elements, the first and second groups being mutually exclusive.

7. The method of claim 1, wherein the measurement report received from the first wireless device comprises an M-bit indicator indicating one of the CSI-RS elements in the first set of CSI-RS elements, where M equals ceil($\log_2$ S) and S equals the number of members in the first set of CSI-RS elements.

8. The method of claim 1, wherein the measurement report received from the first wireless device comprises an M-bit indicator indicating one of the CSI-RS elements in the first set of CSI-RS elements, where M equals ceil($\log_2$ $S_{MAX}$) and $S_{MAX}$ equals the maximum number of members in any one of the predetermined groups of two or more of the N CSI-RS elements that can be indicated with the predetermined set of K-bit indicators.

9. The method of claim 1, wherein the measurement report received from the first wireless device comprises an M-bit indicator indicating one of the CSI-RS elements in the first set of CSI-RS elements, where M equals ceil($\log_2$ S) and S equals the number of members in the first set of CSI-RS elements.

10. The method of claim 1, wherein the measurement report comprises measurement data for Q of the CSI-RS elements, where 1<Q<S, S being the number of members in the first set of CSI-RS elements, and wherein the measurement report further includes an indicator identifying which Q of the S members in the first of CSI-RS elements are represented in the measurement report.

11. A method for measuring channel-state information reference signal (CSI-RS) elements in a wireless communication network, the method comprising, in a wireless device:

using a first K-bit indicator received from the wireless communication network to identify a first set of CSI-RS elements from a set of N CSI-RS elements, wherein each CSI-RS element corresponds to at least one resource element in a time-frequency grid of resource elements and wherein K<N; and performing measurements on the identified first set of CSI-RS elements;

wherein the first K-bit indicator is one of a predetermined set of K-bit indicators, where each member of the predetermined set of K-bit indicators uniquely corresponds to a CSI-RS element or group of CSI-RS elements from among the N CSI-RS, according to a predetermined mapping, such that each member of a first subset of the predetermined set of K-bit indicators uniquely indicates a single one of the N CSI-RS elements and such that each member of a second subset of the predetermined indicators uniquely indicates a predetermined group of two or more of the N CSI-RS elements, wherein the first subset of the predetermined set of K-bit indicators consists of N indicators, each uniquely indicating a single one of the N CSI-RS elements.

12. The method of claim 11, wherein K>ceil($\log_2$ N) or K=ceil($\log_2$ N)+1.

13. The method of claim 11, wherein each of the N CSI-RS elements comprises a pair of resource elements in an Orthogonal Frequency-Division Multiplexing (OFDM) resource element grid, and wherein performing measurements on the identified first set of CSI-RS elements comprises, for each CSI-RS element, combining measurements of the pair of resource elements.

14. The method of claim 11, wherein N is a power of 2, and K=$\log_2$ N+1, and wherein the first subset of the predetermined set of K-bit indicators consists of N indicators, each uniquely indicating a single one of the N CSI-RS elements, and wherein the second subset includes N/2 indicators that each uniquely identify a group of two CSI-RS elements from the N CSI-RS elements.

15. The method of claim 14, wherein K≥8 and wherein the second subset further includes N/4 indicators that each uniquely identify a group of four CSI-RS elements from the N CSI-RS elements.

16. The method of claim 11, wherein the second subset includes one indicator that indicates that all N CSI-RS elements are to be measured.

17. The method of claim 11, wherein the method further comprises sending, in a measurement report sent to the wireless communications network, an M-bit indicator indicating one of the CSI-RS elements in the first set of CSI-RS elements, where M equals ceil($\log_2$ S) and S equals the number of members in the first set of CSI-RS elements.

18. The method of claim 11, wherein the method further comprises sending, in a measurement report sent to the wireless communications network, an M-bit indicator indicating one of the CSI-RS elements in the first set of CSI-RS elements, where M equals ceil($\log_2$ $S_{MAX}$) and $S_{MAX}$ equals the maximum number of members in any one of the predetermined groups of two or more of the N CSI-RS elements that can be indicated with the predetermined set of K-bit indicators.

19. The method of claim 11, wherein the method further comprises sending, in a measurement report sent to the wireless communications network, measurement data for Q of the CSI-RS elements, where 1<Q<S, S being the number of members in the first set of CSI-RS elements, and further including in the measurement report an indicator identifying which Q of the S members in the first of CSI-RS elements are represented in the measurement report.

20. A wireless device configured to measure channel-state information reference signal (CSI-RS) elements in a wireless communication network, comprising:

transceiver circuitry; and processing circuitry operatively associated with the transceiver circuitry and configured to:

use a first K-bit indicator received from the wireless communication network to identify a first set of CSI-RS elements from a set of N CSI-RS elements, wherein each CSI-RS element corresponds to at least one resource element in a time-frequency grid of resource elements and wherein K<N; and send, to the wireless communications network, a measurement report corresponding to at least one of the first set of CSI-RS elements;

wherein the first K-bit indicator is one of a predetermined set of K-bit indicators, where each member of the predetermined set of K-bit indicators uniquely corresponds to a CSI-RS element or group of CSI-RS elements from among the N CSI-RS, according to a predetermined mapping, such that each member of a first subset of the predetermined set of K-bit indicators uniquely indicates a single one of the N CSI-RS elements and such that each member of a second subset of the predetermined indicators uniquely indicates a predetermined group of two or more of the N CSI-RS elements, wherein the first subset of the predetermined set of K-bit indicators consists of N indicators, each uniquely indicating a single one of the N CSI-RS elements.

* * * * *